(12) United States Patent
Kobayashi et al.

(10) Patent No.: US 8,191,439 B2
(45) Date of Patent: Jun. 5, 2012

(54) WAVE-GEAR-TYPE LINEAR-ACTUATION MECHANISM

(75) Inventors: Masaru Kobayashi, Azumino (JP); Stéphanie Moune, Azumino (JP)

(73) Assignee: Harmonic Drive Systems Inc., Shinagawa-Ku, Tokyo (JP)

(*) Notice: Subject to any disclaimer, the term of this patent is extended or adjusted under 35 U.S.C. 154(b) by 548 days.

(21) Appl. No.: 12/436,842

(22) Filed: May 7, 2009

(65) Prior Publication Data
US 2009/0293659 A1    Dec. 3, 2009

(30) Foreign Application Priority Data

May 28, 2008  (JP) ................. 2008-139557

(51) Int. Cl.
*F16H 27/02* (2006.01)
*F16H 55/14* (2006.01)
*F16H 35/00* (2006.01)

(52) U.S. Cl. .................. 74/89.23; 74/461; 74/640
(58) Field of Classification Search ............. 74/89.23, 74/461, 640
See application file for complete search history.

(56) References Cited

U.S. PATENT DOCUMENTS

| | | | | |
|---|---|---|---|---|
| 2,979,964 | A | * | 4/1961 | Musser ............ 74/424.75 |
| 5,370,011 | A | * | 12/1994 | Gilges et al. ............ 74/89 |
| 6,772,655 | B2 | * | 8/2004 | Poehlau ............ 74/640 |
| 7,673,598 | B2 | * | 3/2010 | Schaefer et al. ........ 123/90.15 |

FOREIGN PATENT DOCUMENTS

JP    2007-154955 A    6/2007

\* cited by examiner

*Primary Examiner* — Thomas R Hannon
*Assistant Examiner* — Phillip A Johnson
(74) *Attorney, Agent, or Firm* — Buchanan Ingersoll & Rooney PC

(57) ABSTRACT

A wave-gear-type linear-actuation mechanism comprises a flat-type wave gear; a lead screw that is a structural component of the wave gear and is formed on an outer peripheral surface of a first circular spline; and a linear-actuation cylinder threaded onto the lead screw, a linear-actuation cylinder 4 having a screw groove that is formed in an inner peripheral surface thereof. It is possible to obtain a linear-actuation mechanism whose holding force during reverse input mode (speed increasing mode) is higher than cases where a cup-type flexible screw is used.

7 Claims, 1 Drawing Sheet

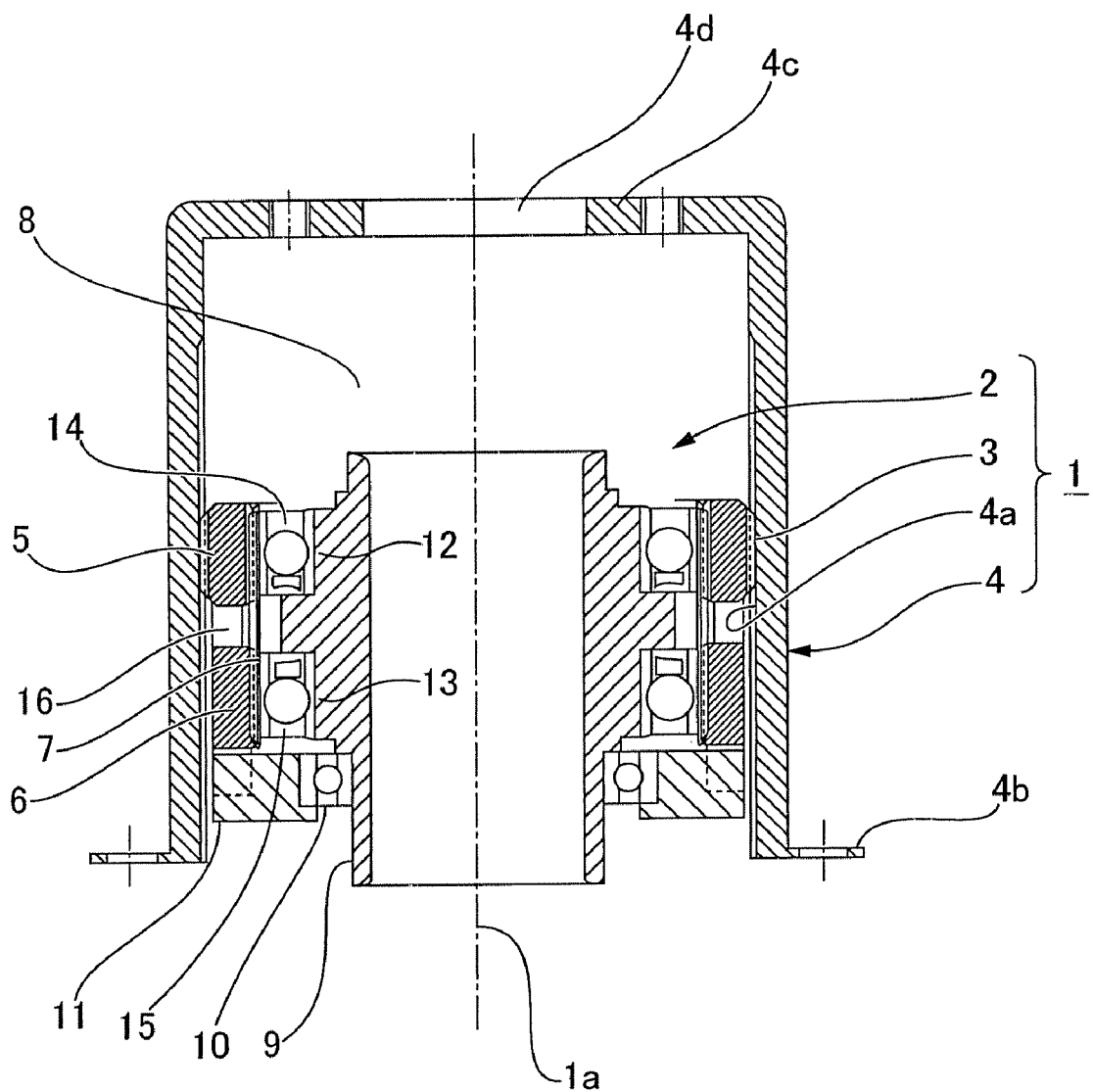

WAVE-GEAR-TYPE LINEAR-ACTUATION MECHANISM

TECHNICAL FIELD

The present invention relates to a wave-gear-type linear-actuation mechanism for converting rotational movement to linear movement, using a flat-type wave gear.

BACKGROUND ART

There are known in the art wave-motion-type mechanisms wherein a mechanism similar to that of a cup-type wave gear mechanism is used as a linear-actuation mechanism for converting rotational movement into linear reciprocating movement. A linear actuator of this type is disclosed in Patent Document 1. The linear actuator disclosed in Patent Document 1 comprises a circular spline having a screw groove in an inner peripheral surface thereof, a flexspline having a screw thread on an outer peripheral surface thereof, and a wave generator. When the wave generator rotates, the locations in which the circular spline and the flexspline are threaded move in a circumferential direction, and rotational movement is converted into linear movement.

Specifically, a cup-shaped flexible screw having a lead screw formed on an outer peripheral surface thereof is used in place of a cup-shaped flexspline in a cup-type wave gear mechanism; and a circular nut threaded onto the lead screw is used in place of the circular spline, the circular nut having a screw groove that is formed in an inner peripheral surface thereof. The flexible screw is bent into an elliptical shape by the wave generator, and threads into the circular nut at either end location of a major axis of the ellipse. When the wave generator rotates, the threading locations move in the circumferential and axial directions. As a result, the rotational movement of the flexible screw is converted to move the circular nut in a linear reciprocating manner.

[Patent Document 1] JP-A 2007-154955

In a conventional wave-gear-type linear-actuation mechanism, a flexible, thin-walled screw is used; therefore, the holding force in the axial direction is limited by the flexible screw. Specifically, the force for holding the circular nut in a prescribed position in the axial direction against an external force is limited by the buckling strength of a diaphragm part of the cup-shaped flexible screw, and the shear strength of the lead screw part.

DISCLOSURE OF THE INVENTION

With the foregoing in view, it is an object of the present invention to provide a wave-gear-type linear-actuation mechanism capable of increasing holding force in an axial direction.

In order to solve the abovementioned problems, according to the present invention there is provided a wave-gear-type linear-actuation mechanism characterized in comprising a first circular spline and a second circular spline coaxially disposed in parallel; a radially flexible cylindrical flexspline disposed inside the first and second circular splines; a wave generator fitted inside the flexspline for flexing the flexspline into a noncircular shape to mesh with the first and second circular splines at a plurality of locations along a circumferential direction; a lead screw formed on an outer peripheral surface of the first circular spline; and a circular nut having a screw groove threaded onto the lead screw. The first circular spline has the same number of teeth as the flexspline; the second circular spline has n more teeth than the flexspline (n is a positive integer); the second circular spline is restrained so as not to rotate; and as the wave generator rotates, the flexspline rotates relative to the second circular spline at a rotational speed corresponding to a difference in number of teeth therebetween, the first circular spline integrally rotates with the flexspline, and the circular nut threaded on the lead screw of the first circular spline moves in the direction of a central axis of the first circular spline as the first circular spline rotates.

In a typical wave-gear-type linear-actuation mechanism according to the present invention, the flexspline is flexed into an elliptical shape by the wave generator, and meshes with the first and second circular splines at either end region of the major axis of the ellipse; and the second circular spline has 2n more teeth than the flexspline.

The first and second circular splines are kept in a state of being capable of relative rotation by a thrust bearing member disposed between the two circular splines.

The wave generator is a hollow wave generator having a hollow part penetrating and extending therethrough in a direction of a central axis thereof.

In the wave-gear-type linear-actuation mechanism of the present invention, a lead screw is formed on the outer peripheral surface of the first circular spline, which has the same number of teeth as the flexspline. The first circular spline is caused to rotate at a reduced speed, and the rotation of the lead screw formed on the first circular spline causes thrust to be generated in the circular nut. Unlike cases in which a cup-shaped flexible screw is used, a lead screw is formed on the outer peripheral surface of the rigid first circular spline; therefore, the resulting thrust can be higher than in cases where a flexible lead screw is used. In a reverse input state that is similar to a rotational speed increasing state, an external force acts on the circular nut in the axial direction, and a large holding force can be obtained in the axial direction due to the low reverse-input efficiency of the portions between the circular nut and the lead screw where the threads engage.

BRIEF DESCRIPTION OF THE DRAWINGS

FIG. 1 is a schematic cross-sectional view showing a wave-gear-type linear-actuation mechanism to which the present invention is applied.

BEST MODE FOR CARRYING OUT THE INVENTION

Embodiments of a wave-gear-type linear-actuation mechanism to which the present invention is applied are described below with reference to the accompanying drawings.

FIG. 1 is a schematic cross-sectional view showing a hollow wave-gear-type linear-actuation mechanism according to the present embodiment. The wave-gear-type linear-actuation mechanism 1 comprises a flat-type wave gear 2; a lead screw 3 caused to rotate by the wave gear 2; and a linear-actuation cylinder (circular nut) 4 threaded onto the lead screw 3, the linear-actuation cylinder having a screw groove 4a.

The flat-type wave gear 2 comprises a first circular spline 5 and a second circular spline 6 that are coaxially disposed in parallel; a radially flexible cylindrical flexspline 7 disposed inside the first and second circular splines 5, 6; and a wave generator 8 coaxially fitted inside the flexspline 7.

The wave generator 8 is hollow and comprises a hollow shaft 9. The hollow shaft 9 is supported in a rotatable state by a stationary-side housing 11, a bearing 10 being interposed therebetween. A first wave plug part 12 and second wave plug part 13, each of which having an elliptical outline, are integrally formed on an outer peripheral surface of the hollow shaft 9, with a fixed gap provided along an axial direction. First and second wave bearings 14, 15 are installed on the first and second wave plug parts 12, 13, respectively. The first and second wave bearings 14, 15 comprise flexible inner and outer races.

The cylindrical flexspline 7 is flexed into an elliptical shape by the wave generator 8, and meshes with the first and second circular splines 5, 6 at either end region of a major axis of the ellipse. The hollow shaft 9 of the wave generator 8 is coupled to a rotational shaft of a motor (not shown). When the wave generator 8 rotates, the locations at which the first and second circular splines 5, 6 mesh with the flexspline 7 move in a circumferential direction.

The first circular spline 5 has the same number of teeth as the flexspline 7. The second circular spline 6 has 2n more teeth than the flexspline 7 (n is a positive integer). In general, the second circular spline 6 is configured to have two more teeth than the flexspline 7. The second circular spline 6 is supported in a non-rotatable state by the stationary-side housing 11, and the second circular spline 6 and the first circular spline 5 are kept in a state of relative rotatability by a low-friction washer, a thrust needle bearing, or another thrust bearing component 16 mounted therebetween.

The lead screw 3 is formed on the outer peripheral surface of the first circular spline 5. The linear-actuation cylinder 4, which has the screw groove 4a formed on an inner peripheral surface thereof and is threaded onto the lead screw 3, is supported in a state of being capable of sliding in the direction of a central axis 1a, but incapable of rotating about the central axis 1a. A wide flange 4b is formed on one open end of the linear-actuation cylinder 4, and the other open end is closed off by an end wall 4c, which has a central hole 4d formed in a center portion thereof.

The operation of the wave gear-type linear-actuation mechanism having the abovedescribed structure will now be described. When the wave generator 8 rotates, the locations where the flexspline 7 meshes with the first and second circular splines 5, 6 move in the circumferential direction. Since the flexspline 7 and the second circular spline 6 have a different number of teeth, relative rotation is generated in accordance with the difference in number of teeth. Since the second circular spline 6 is secured to a side of the housing 11 and does not rotate, the flexspline 7 is caused to rotate. Since the first circular spline 5 has the same number of teeth as the flexspline 7, no relative rotation is generated between the first circular spline 5 and the flexspline 7. Accordingly, the first circular spline 5 integrally rotates with the flexspline 7 at a reduced rotational speed (rotational speed reduction mode).

When the first circular spline 5 on whose outer peripheral surface is formed the lead screw 3 is caused to rotate, the linear-actuation cylinder 4 slides in the direction of the central axis 1a, the linear-actuation cylinder 4 having the screw groove 4a and being threaded onto the lead screw 3. The direction in which the linear-actuation cylinder 4 slides changes in accordance with a direction of input rotation (the rotation of the wave generator 8).

As has been described above, the wave-gear-type linear-actuation mechanism 1 has a structure in which a flat-type wave gear is used, and thrust is obtained from a lead screw 3 formed on the outer peripheral surface of a rigid first circular spline 5. Therefore, it is possible to obtain a linear-actuation mechanism whose holding force during reverse input state (rotational-speed increasing state) is higher than cases where a cup-type flexible screw is used. Moreover, using a flat-type wave gear also presents an advantage in that the diameter of the hollow part of the linear-actuation mechanism can be more readily enlarged than in a case where a cup-type flexible screw is used.

In the abovedescribed example, the flexspline 7 is flexed into an elliptical shape and caused to mesh with the first and second circular splines 5, 6 at two locations in the circumferential direction; however, it is also possible for the flexspline 7 to be flexed into a three-lobed configuration and for meshing to occur at three sites in the circumferential direction. In this case, the difference in the number of teeth may be set at 3n. It is also possible for meshing to occur at four or more locations.

The invention claimed is:

1. A wave-gear-type linear-actuation mechanism characterized in comprising:
   a first circular spline and a second circular spline coaxially disposed in parallel;
   a radially flexible cylindrical flexspline disposed inside the first and second circular splines;
   a wave generator fitted inside the flexspline, the wave generator bending the flexspline into a noncircular shape, and causing the flexspline to mesh with the first and second circular splines at a plurality of locations along a circumferential direction;
   a lead screw formed on an outer peripheral surface of the first circular spline; and
   a circular nut having a screw groove threaded onto the lead screw; wherein the first circular spline has the same number of teeth as the flexspline;
   the second circular spline has at least n more teeth than the flexspline (n is a positive integer);
   the second circular spline is restrained so as not to rotate;
   the wave generator has a hollow shaft, a first wave plug and a second wave plug, each of which plugs has a noncircular outline and is integrally formed on an outer peripheral surface of the hollow shaft with a fixed gap provided along an axial direction thereof between the first plug and the second plug, and first and second wave bearings are installed on the first and second wave plug, respectively, and,
   as the wave generator rotates, the flexspline rotates relative to the second circular spline at a rotational speed corresponding to a difference in a number of teeth on the second circular spline and a number of teeth on the flexspline, the first circular spline integrally rotates with the flexspline, and the circular nut threaded on the lead screw of the first circular spline moves in a direction of a central axis of the first circular spline as the first circular spline rotates.

2. The wave-gear-type linear-actuation mechanism of claim 1, wherein
   each of the first wave plug and second wave plug has an elliptical outline;
   the flexspline is bent into an elliptical shape by the wave generator, and meshes with the first and second circular splines at either end region of the major axis of the ellipse; and
   the second circular spline has 2n more teeth than the flexspline.

3. The wave-gear-type linear-actuation mechanism of claim 1, wherein
   the first and second circular splines are kept in a state of being capable of relative rotation by a thrust bearing member disposed between the two circular splines.

4. A wave-gear-type linear-actuation mechanism comprising:
- a wave gear having a lead screw, and a circular nut having a screw groove formed on an inner peripheral surface thereof and threaded onto the lead screw, the wave gear being located inside the circular nut in a coaxial state in operation;
- the wave gear has a first circular spline and a second circular spline that are coaxially disposed in parallel; a radially flexible cylindrical flexspline disposed inside the first and second circular splines; and a wave generator coaxially fitted inside the flexspline, the first circular spline being formed with the lead screw on an outer peripheral surface thereof, and the wave generator bending the flexspline into a noncircular shape, and causing the flexspline to mesh with the first and second circular splines at a plurality of locations along a circumferential direction;
- the first circular spline has the same number of teeth as the flexspline, the second circular spline has at least n more teeth than the flexspline where n is a positive integer, and the second circular spline is restrained so as not to rotate; and
- the wave generator has a hollow shaft; a first wave plug part and second wave plug part, each of which having a noncircular outline and integrally formed on an outer peripheral surface of the hollow shaft with a fixed gap provided along an axial direction thereof, and first and second wave bearings installed on the first and second wave plug parts, respectively, and,
- as the wave generator rotates, the flexspline rotates relative to the second circular spline at a rotational speed corresponding to a difference in number of teeth therebetween, the first circular spline(s) integrally rotates with the flexspline, and the circular nut threaded on the lead screw of the first circular spline moves in a direction of a central axis of the first circular spline as the first circular spline rotates.

5. The wave-gear-type linear-actuation mechanism of claim 4, wherein
- the circular nut has a cylinder body formed on the inner peripheral surface with the screw groove, a flange formed on one end of the cylindrical body and spreading radially and outwardly, an end wall closing off the other end of the cylindrical body, and a central hole formed in a center portion of the end wall.

6. The wave-gear-type liner-actuation mechanism of claim 4, wherein
- the flexspline is bent into an elliptical shape by the wave generator, and meshes with the first and second circular splines at either end region of the major axis of the ellipse; and
- the second circular spline has 2n more teeth than the flexspline.

7. The wave-gear-type linear-actuation mechanism of claim 4, wherein
- the first and second circular splines are kept in a state of being capable of relative rotation by a thrust bearing member disposed between the two circular splines.

\* \* \* \* \*